Figure 1:
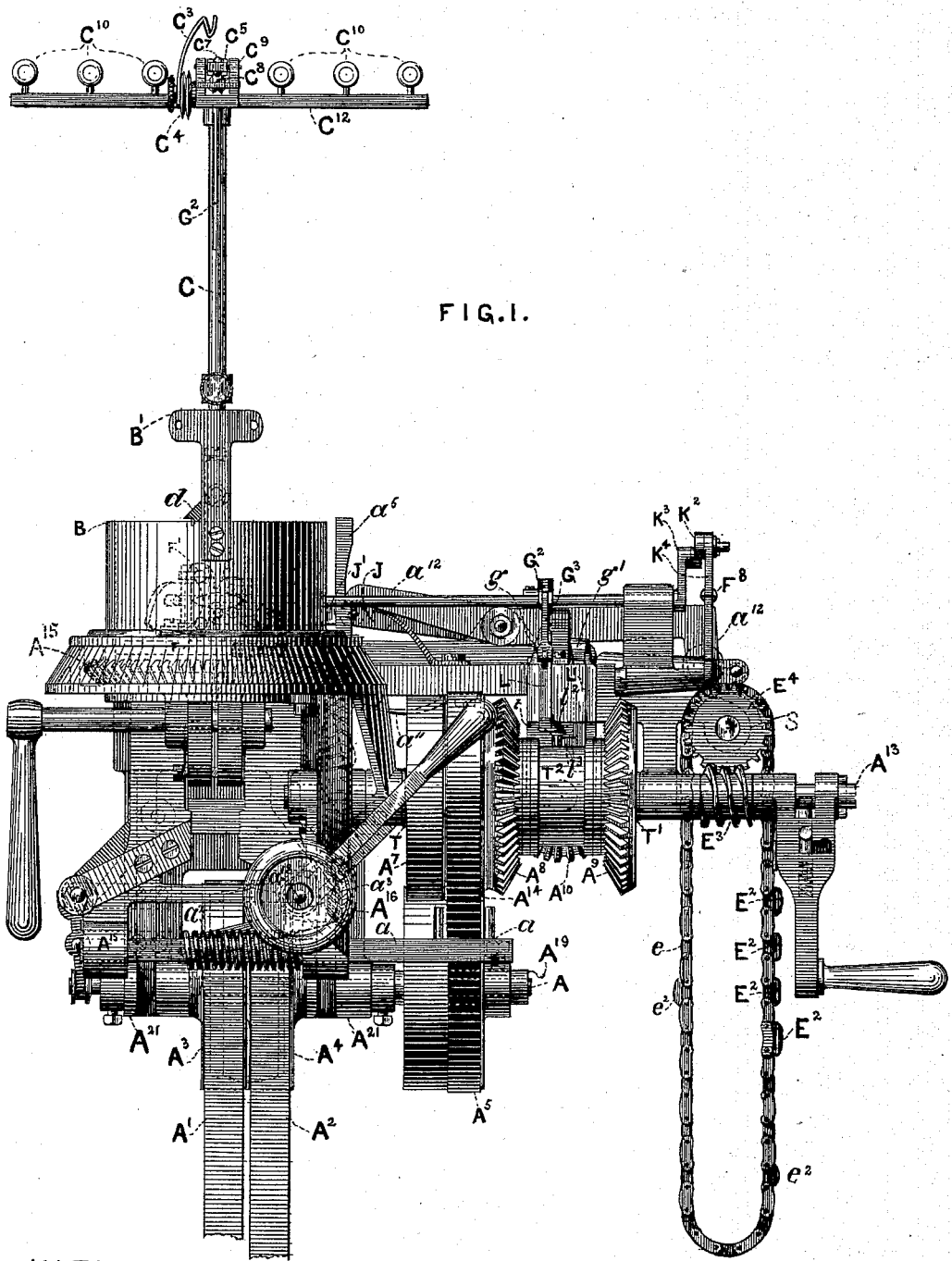

(No Model.) 9 Sheets—Sheet 1.
H. C. RIGHTMIRE.
CIRCULAR KNITTING MACHINE.

No. 410,118. Patented Aug. 27 1889.

WITNESSES: INVENTOR:

(No Model.) 9 Sheets—Sheet 3.
H. C. RIGHTMIRE.
CIRCULAR KNITTING MACHINE.
No. 410,118. Patented Aug. 27 1889.
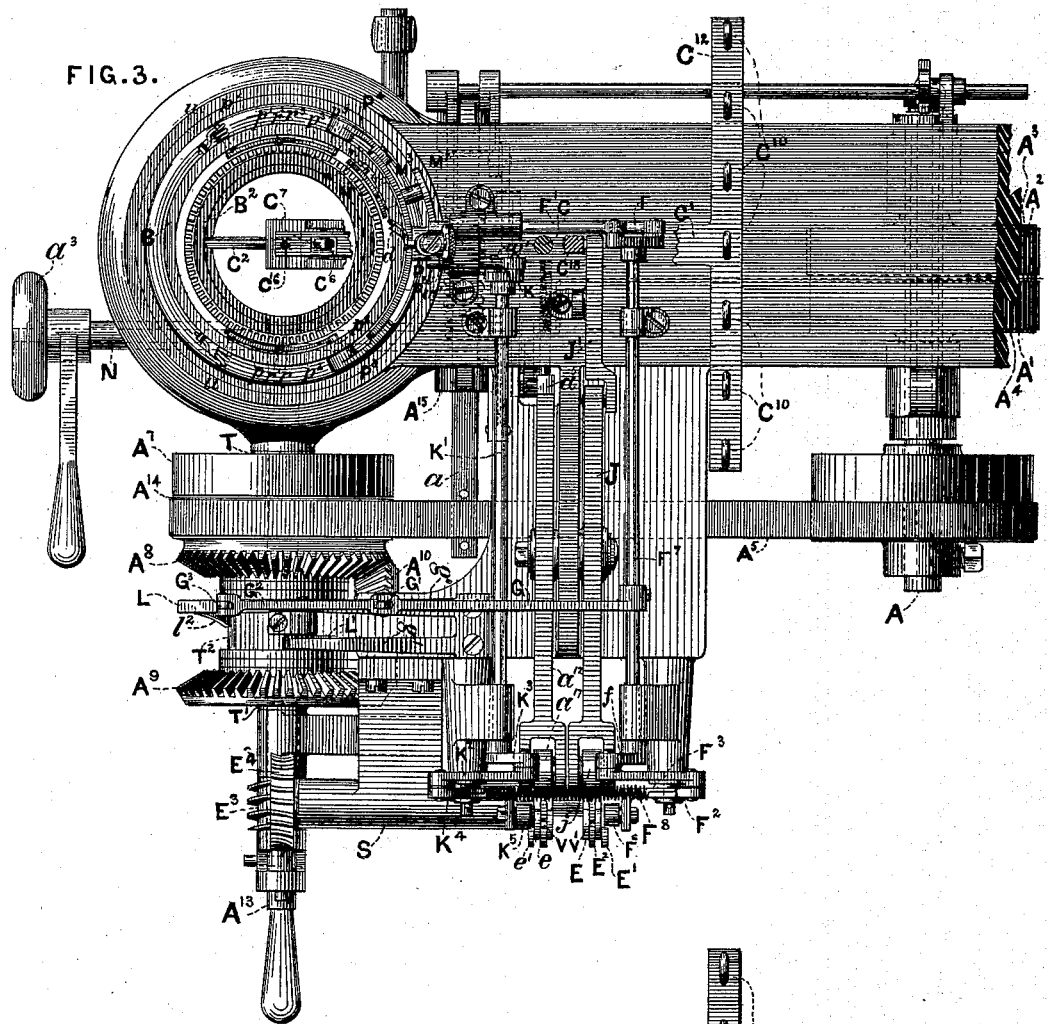
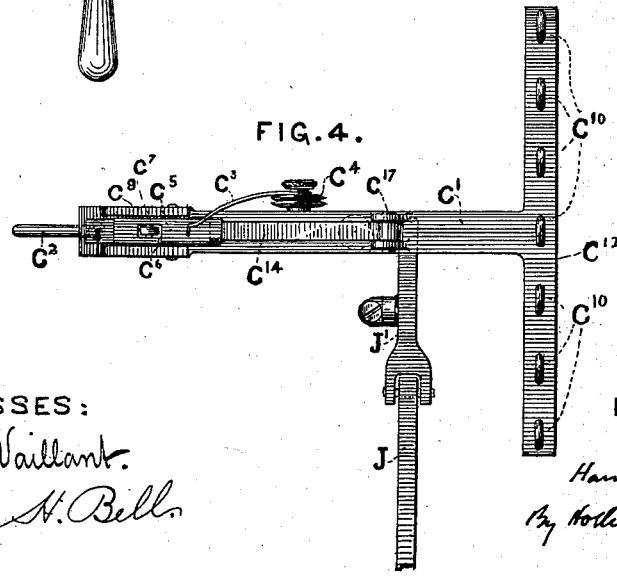
WITNESSES:
Geo. N. Vaillant.
James N. Bell.
INVENTOR:
Harry C. Rightmire
By Hollingsworth & Braly
Attorneys.

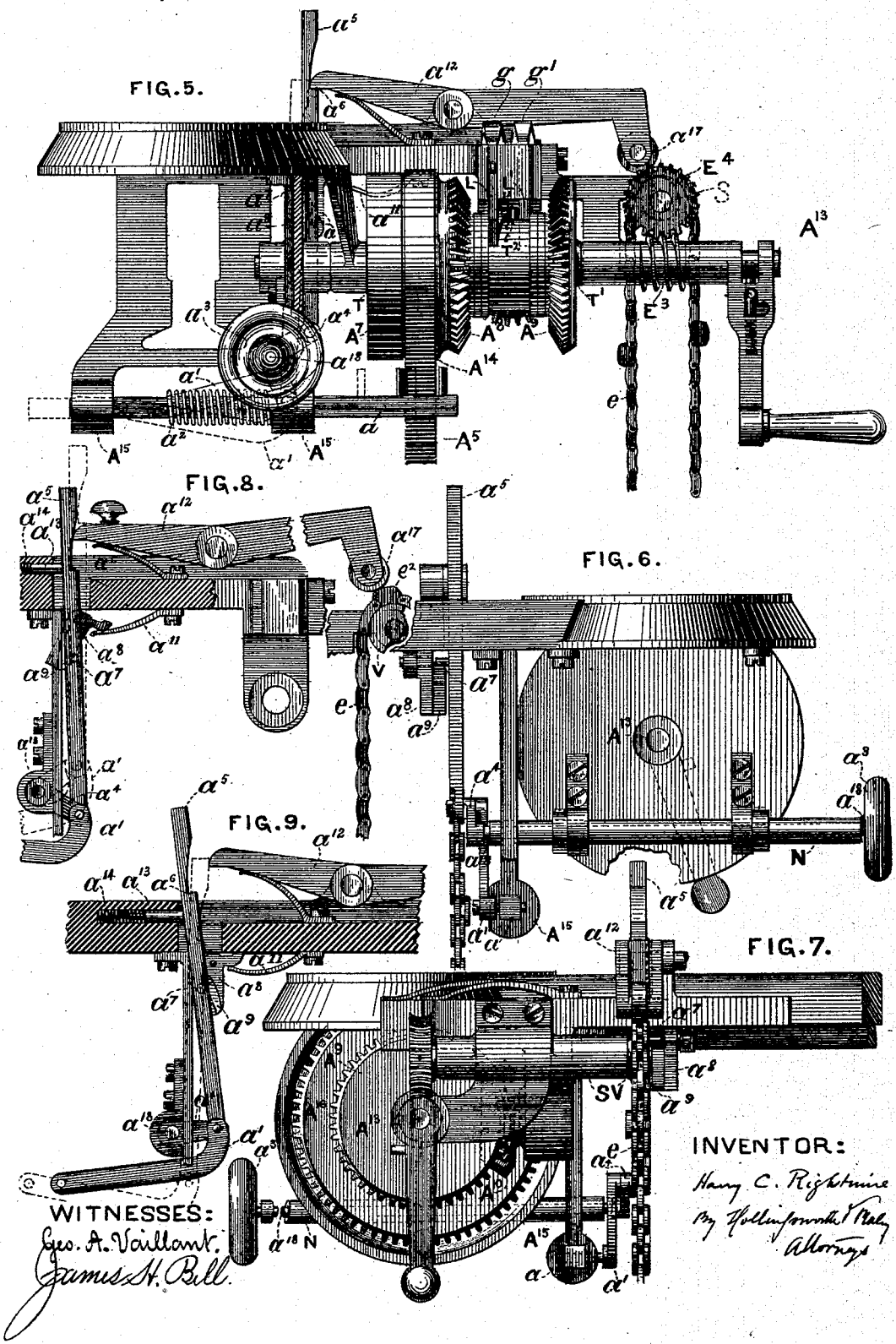

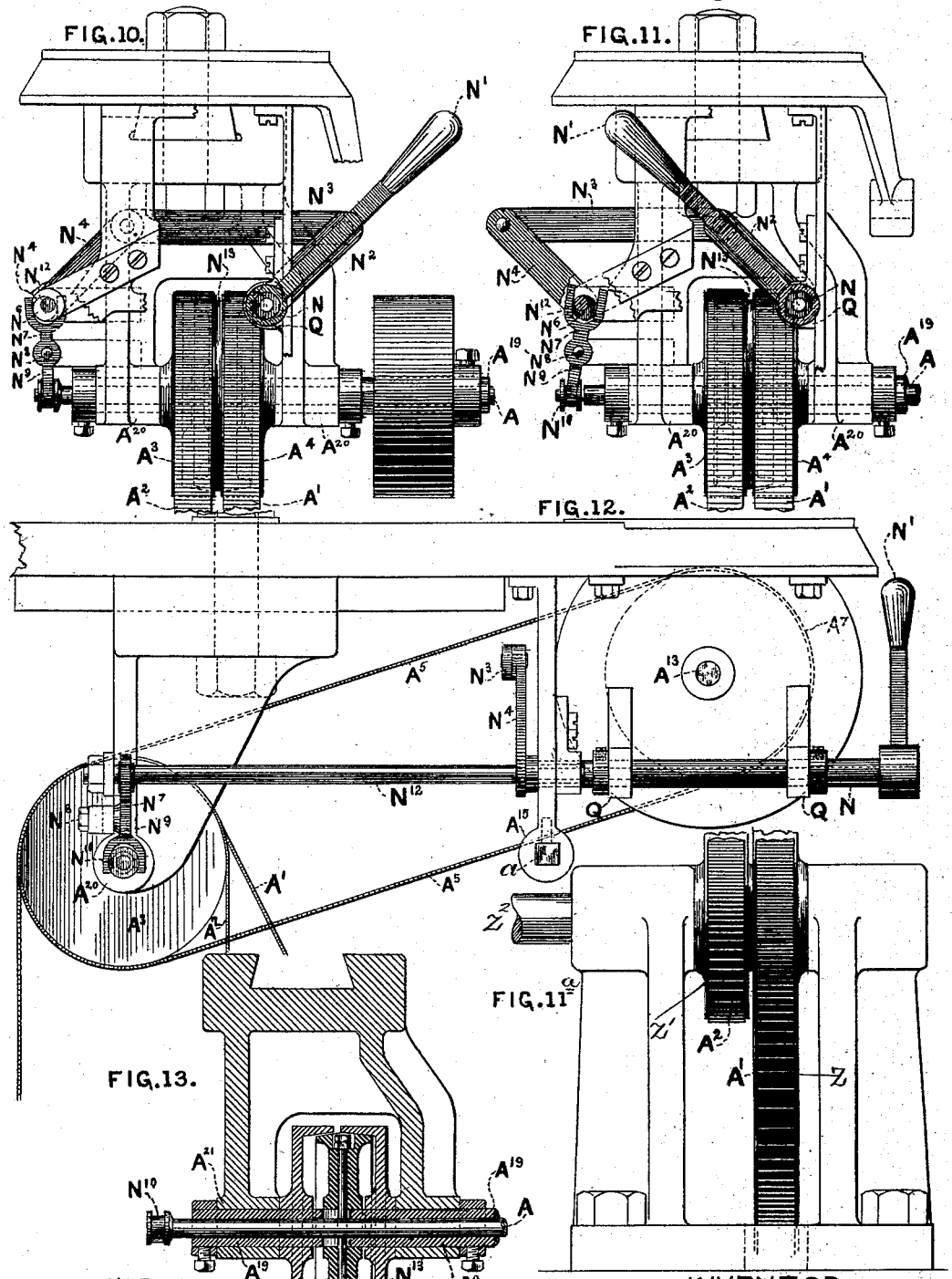

(No Model.)　　　　　　　　　　　　　　　9 Sheets—Sheet 6.
H. C. RIGHTMIRE.
CIRCULAR KNITTING MACHINE.
No. 410,118.　　　　　　　　　　Patented Aug. 27 1889.
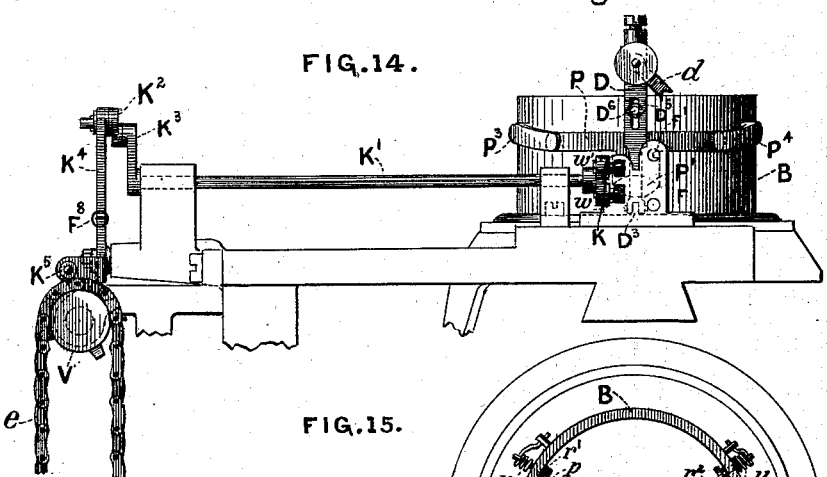
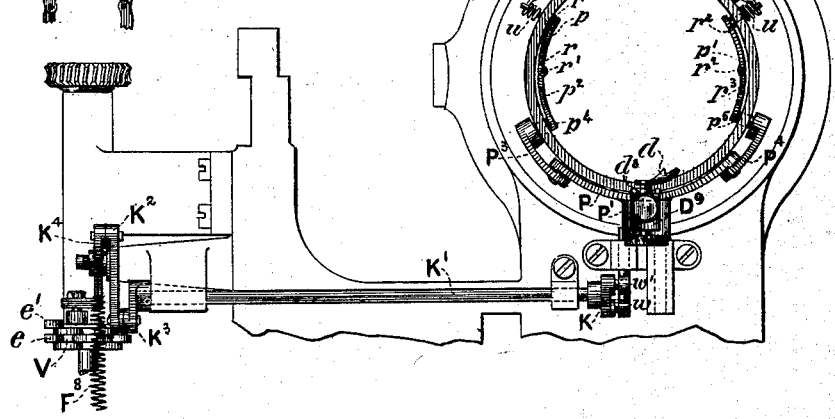
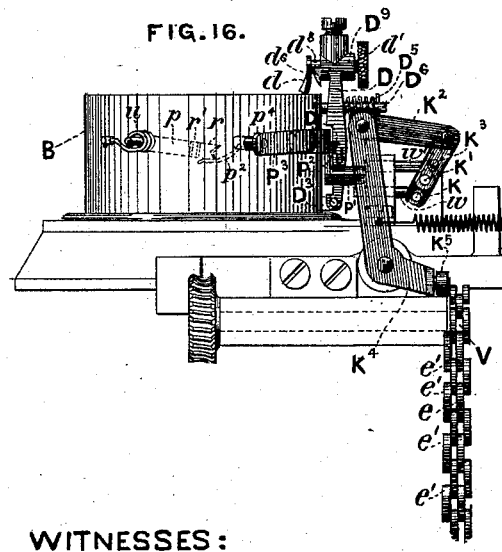
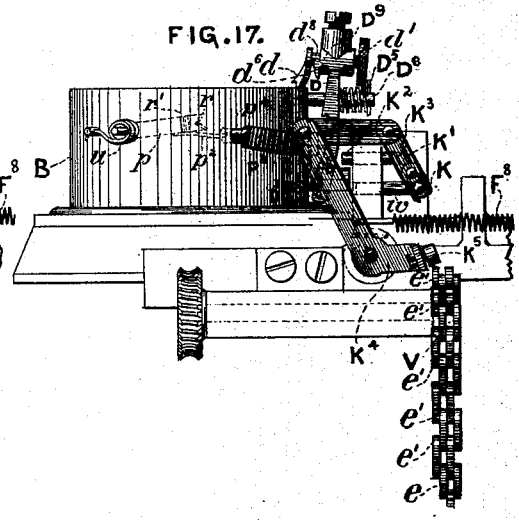
WITNESSES:　　　　　　　　　　　　INVENTOR:
Geo. A. Vaillant.　　　　　　　　　Harry C. Rightmire
James H. Bell.　　　　　　　By Hollingsworth & Haley
　　　　　　　　　　　　　　　　Attorneys (No Model.) 9 Sheets—Sheet 7.
H. C. RIGHTMIRE.
CIRCULAR KNITTING MACHINE.
No. 410,118. Patented Aug. 27 1889.
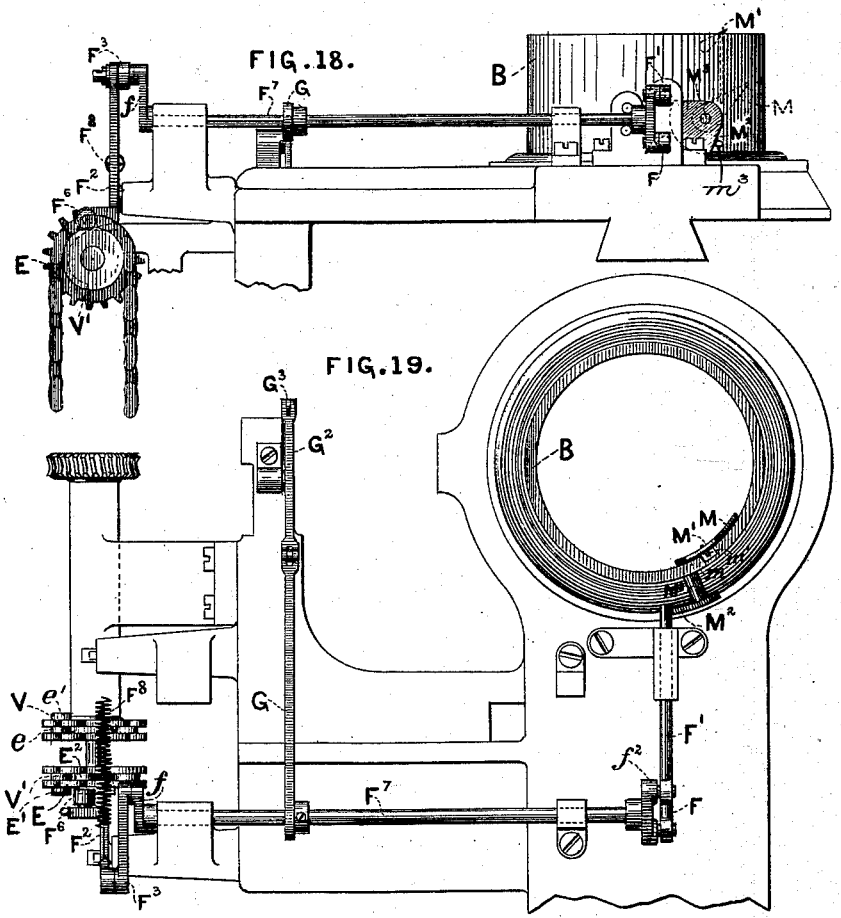
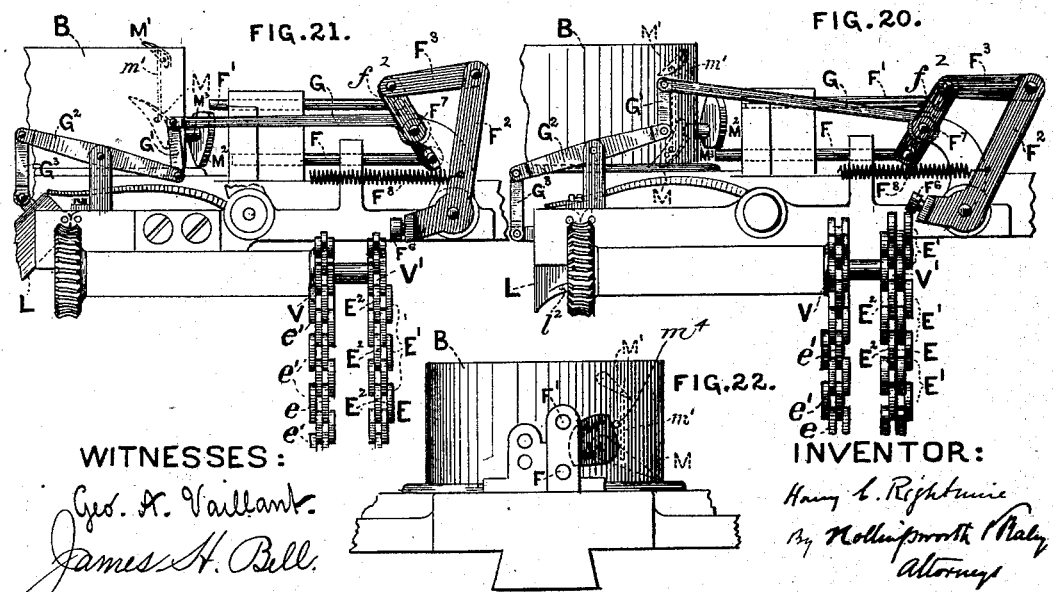
WITNESSES:
Geo. A. Vaillant.
James H. Bell.
INVENTOR:
Harry C. Rightmire
By Hollingsworth & Haly
Attorneys (No Model.) 9 Sheets—Sheet 8.
H. C. RIGHTMIRE.
CIRCULAR KNITTING MACHINE.
No. 410,118. Patented Aug. 27 1889.
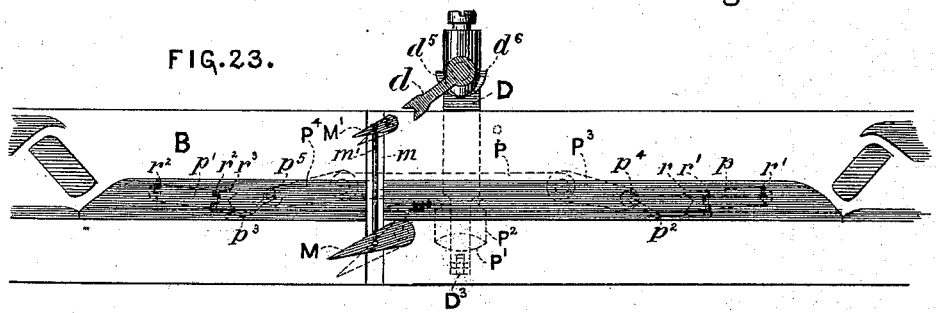
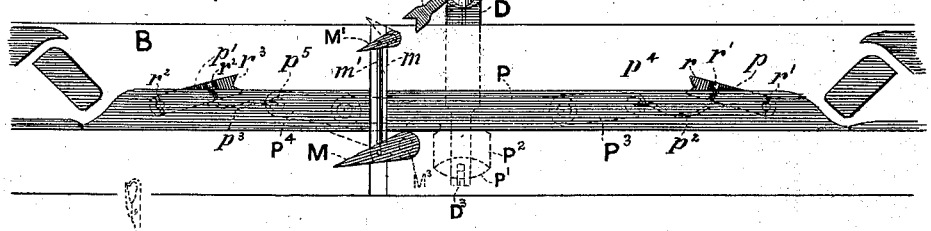
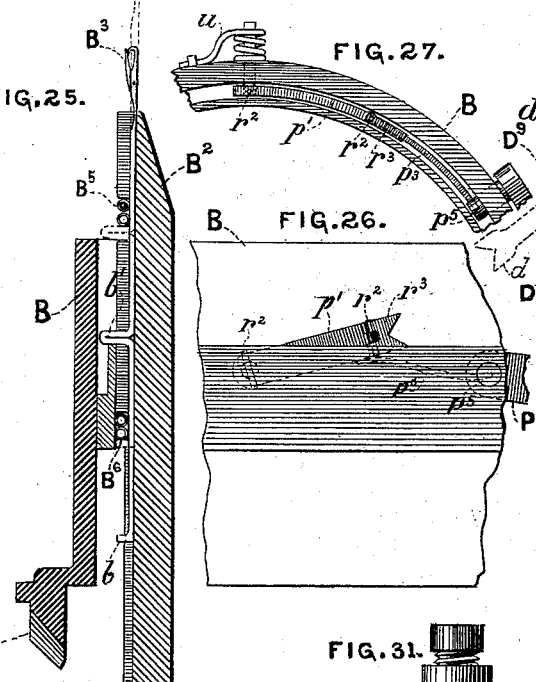
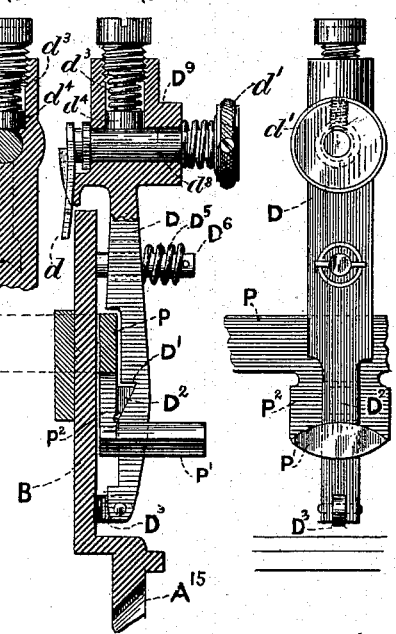
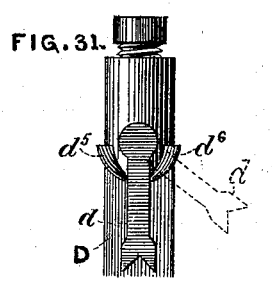
WITNESSES: Geo. A. Vaillant. James H. Bell.
INVENTOR: Harry C. Rightmire By Hollingsworth & Haley Attorneys (No Model.) 9 Sheets—Sheet 9.
H. C. RIGHTMIRE.
CIRCULAR KNITTING MACHINE.
No. 410,118. Patented Aug. 27 1889.
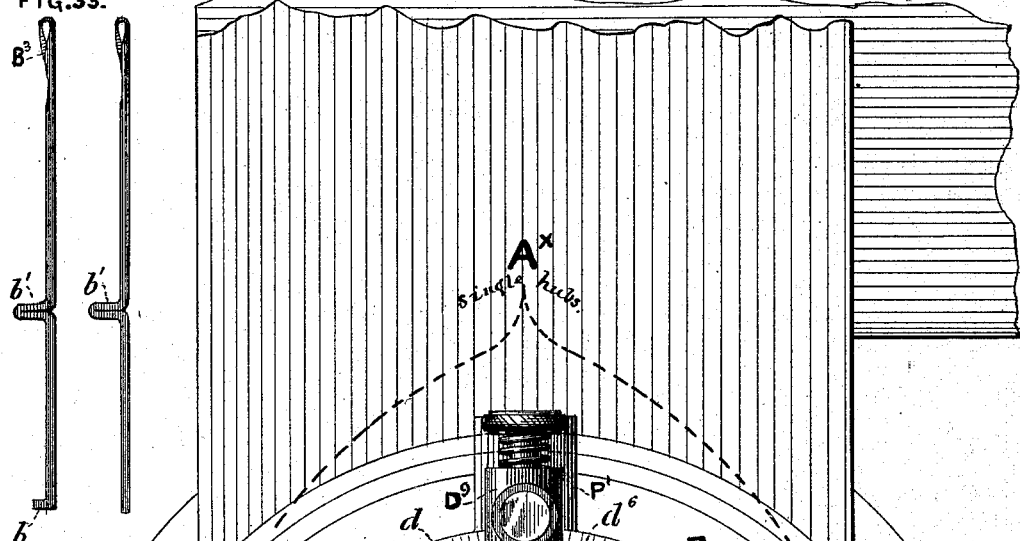
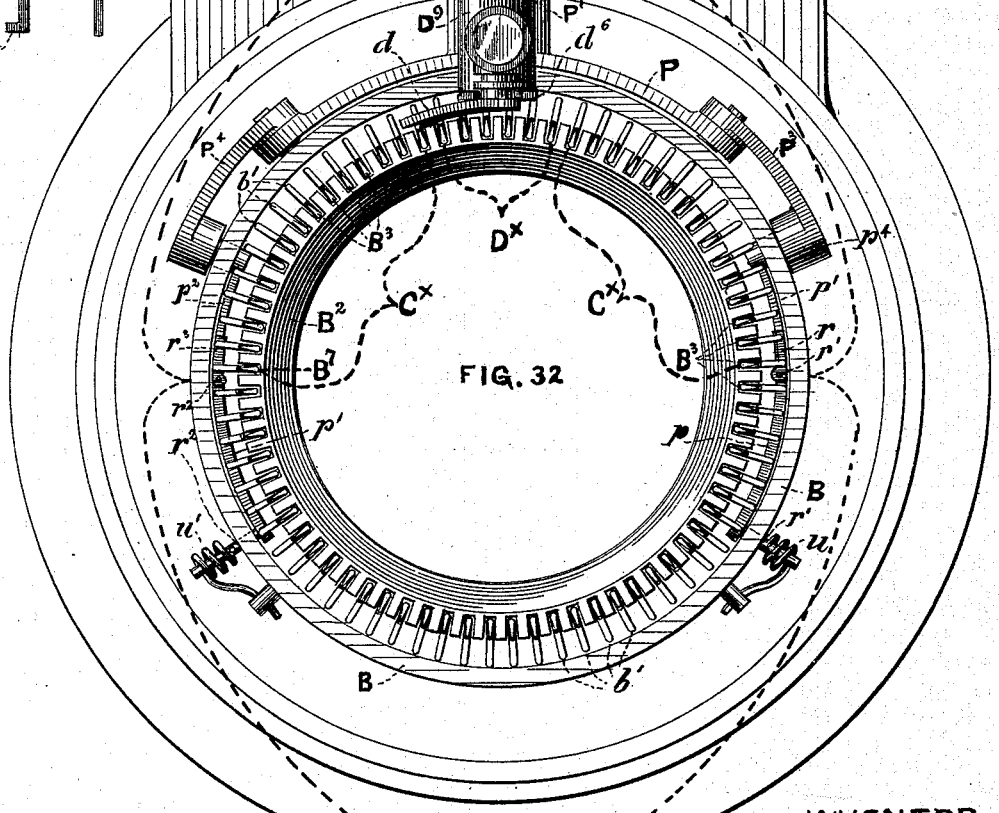
WITNESSES:
James H. Bell
E. Reese
INVENTOR:
Harry C. Rightmire
By Hollingsworth & Riley
Attorneys.

United States Patent Office.

HARRY C. RIGHTMIRE, OF PHILADELPHIA, PENNSYLVANIA, ASSIGNOR OF ONE-HALF TO THOMAS A. PEARCE, OF SAME PLACE.

CIRCULAR-KNITTING MACHINE.

SPECIFICATION forming part of Letters Patent No. 410,118, dated August 27, 1889.

Application filed December 1, 1888. Serial No. 292,418. (No model.)

*To all whom it may concern:*

Be it known that I, HARRY C. RIGHTMIRE, of Philadelphia, in the State of Pennsylvania, have invented certain new and useful Improvements in Circular-Knitting Machines, whereof the following is a specification, reference being had to the accompanying drawings.

My invention is adapted for use in that class of knitting-machines upon which stockings are manufactured by first forming the leg by a continuous rotary movement and then throwing out a portion of the needles and forming the heel, &c., by an oscillating movement of the cam-cylinder.

The main features of improvement comprised in my said invention are as follows: First, the automatic control of all the successive operations which together constitute the series of heel and toe forming movements, and which are, broadly speaking, five—viz: the change from a continuous rotary movement of the cam-cylinder to an oscillating movement, the raising of one-half of the needles, collectively, to the idle level, the raising of individual active needles at each oscillation until the minimum number remains active, the depressing of individual idle needles at each oscillation, and the depressing of all the remaining idle needles collectively; second, the automatic control of an extra thread—such, for instance, as a colored yarn—whereby any desired portions of the stockings may be knit of mixed colors and the residue in plain colors; third, an automatic stop-motion for the machine.

In addition to these main features my invention includes numerous improvements in the details of the mechanism whereby the needles are elevated and depressed, this mechanism being in its general principles of operation similar to that patented in my Letters Patent No. 388,721, dated August 28, 1888.

Figure 2:
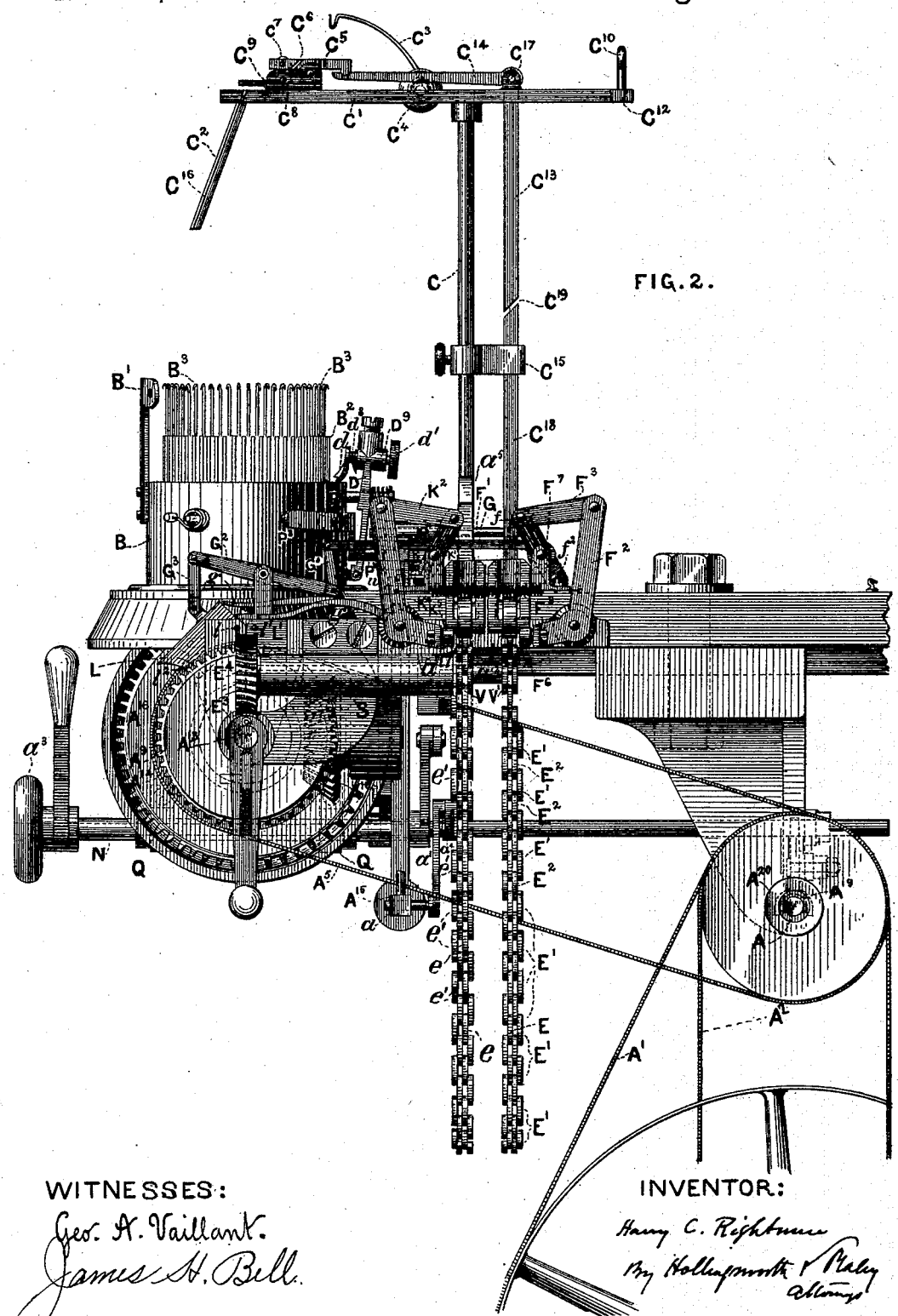

In the accompanying drawings, Figure 1 represents a front elevation of my knitting-machine, the needle-cylinder being removed. Fig. 2 is a side elevation of the same, showing needle-cylinder. Fig. 3 is a plan view of the same without the automatic thread-controller. Fig. 4 is a plan view of the thread-controller detached from the machine. Fig. 5 is a front view of the belt-shifting mechanism. Fig. 6 is a side view of the same from the left-hand side of Fig. 1. Fig. 7 is a side view from the right-hand side of Fig. 1. Fig. 8 is a detail view showing the automatic trip of the belt-shifter in a descending position, and Fig. 9 is a similar detail view showing the parts in ascending position. Fig. 10 is a front view of the mechanism for changing the speed, the parts being in position for high speed. Fig. 11 is a similar view, with the parts in position for low speed. Fig. 11$^a$ is a partial view of the driving-pulleys for producing high or low speed. Fig. 12 is a side view of said parts, and Fig. 13 is a partial transverse section of the friction-clutch for change of speed. Fig. 14 is a partial rear view of the mechanism for throwing into and out of action the pawls which raise and lower individual needles. Fig. 15 is a plan view of the same. Fig. 16 is a side elevation showing the position of said parts when the lowering-pawl is active and the raising-pawl is idle. Fig. 17 is a similar side elevation showing the converse position of said parts. Fig. 18 is a partial side elevation showing the automatic mechanism for throwing into and out of action the cams which raise or lower the needles collectively. Fig. 19 is a plan view of said parts. Fig. 20 is a side elevation of the same in position for raising the needles. Fig. 21 is a side elevation of the same in position for lowering them. Fig. 22 is a partial rear view of the same parts in the position of Fig. 20. Fig. 23 is a view of the inside of the cam-cylinder developed on a plane, showing the relative positions of the raising and lowering pawls, the position of the parts being that assumed when the lowering-pawl is active and the raising-pawl idle. Fig. 24 is a similar view of the said parts in a converse position. The scale of the remaining figures is much enlarged. Fig. 25 is a vertical section through one side of the needle-cylinder and cam-cylinder, showing the details of certain of the needles. Fig. 26 is an inside view of a fragment of the cam-cylinder, showing the details of the needle-raising pawl. Fig. 27 is a plan view of the same. Fig. 28 is a partial vertical section through the standard of the lowering-pawl, showing the details of the mechanism whereby it is thrown into and out of play. Fig. 29 is a partial vertical section through said standard at right angles to the plane of section in Fig. 28. Fig. 30 is an outside or rear view of said standard. Fig. 31 is an inside view of the upper portion thereof. Fig. 32 is a partial plan view or diagram showing the grouping of the two kinds of needles used, and Fig. 33 is a side view of each kind of needle.

To avoid confusion in the following description, I have as far as possible treated the mechanism as divided into groups, each of which, though actually combined and co-operating with the remainder, may be considered as distinct, so far as the action of its individual members is concerned.

The general features of the needle-cylinder, cam-cylinder, and driving-gears are those common to this class of machines and detailed description is therefore not deemed necessary. Thus B represents the cam-cylinder; $B^2$, the needle-cylinder; $B^3$, the needles; $B'$, the thread-guide; $A^{15}$, the bevel-gear on the bottom of the cam-cylinder; $A^{16}$, the corresponding driving-gear, meshing with the gear $A^{15}$, and $A^{13}$ the shaft on which said gear $A^{16}$ is mounted. This shaft is provided with mechanism adapted to rotate it continuously in one direction for a time, and thereafter to oscillate it throughout a half-rotation during another interval. The mechanism whereby this change from rotating to oscillating movement is directly accomplished is identical with that patented by me in Letters Patent No. 385,322, June 26, 1888, and may be briefly summarized as follows: It consists of a pair of bevel-gears $A^8$ $A^9$, running freely upon the shaft $A^{13}$ and provided with an intermediate bevel-pinion $A^{10}$, whereby the gear $A^9$ is driven from the gear $A^8$, but in an opposite direction. Upon the rear face of the gear $A^8$ is cast an annular rim or flange $A^{14}$, which constitutes the fast pulley, and immediately adjacent thereto the loose pulley $A^7$ is mounted freely upon the shaft $A^{13}$.

Intermediate between the bevel-gears $A^8$ and $A^9$ is a cylinder $T^2$, containing a longitudinally-sliding bolt, and at either end of the cylinder, and immediately adjacent to the proximate faces of said gears, are two disks, which are secured to the respective gears. Either of the disks may by the shifting of the bolt be coupled to the cylinder $T^2$. This cylinder is rigidly secured to the shaft $A^{13}$, and accordingly as the bolt is shifted to one end or the other either of the gears $A^8$ or $A^9$ is thus intermediately coupled to said shaft. The longitudinal shifting of the bolt is effected by means of a pin $t$, which protrudes through a longitudinal slot in the cylinder $T^2$.

A pair of bolt-shifters L L', pivoted at $l$ $l'$, respectively, are provided with cams $l^2$ $l^3$, which, when thrown down within the range of rotation of the pin $t$, throw it alternately in opposite directions, as described in my Letters Patent No. 385,322, above referred to. Either or both of these shifters L L' may be thrown down into position to engage with said pin, and when down they are held by spring-fingers $g$ $g'$.

Assuming it to be understood that the shifter L' is continuously down (thereby, of course, maintaining the pin $t$ of the bolt in position for continuous rotation in one direction only) and that the other shifter L is raised clear, as shown in Fig. 2, the mechanism for automatically throwing the shifter L down into an operative position will now be described. Upon the rear face of the gear $A^9$ is attached a sleeve T', upon which is a screw-thread or worm $E^3$, which engages with a worm-wheel $E^4$, mounted upon a shaft (see Fig. 2) rotating in a horizontal sleeve-bearing S and carrying at its other end a pair of sprocket-wheels V V'. These sprocket-wheels carry endless pattern-chains E $e$, respectively, which are provided with projecting studs or enlarged extra links to trip or actuate certain levers, hereinafter to be described. These pattern-chains and levers controlled thereby are the actuating members of the different groups of automatic shifting mechanism, the first of which is the reversing mechanism just mentioned, and the details of its connection with the pattern-chain levers are as follows: The hinged shifter L is attached to a link $G^3$, secured to one end of the lever $G^2$, at whose other end a second link G' connects it with a rocking arm G, rigidly mounted upon the rock-shaft $F^7$. A lever-arm $f$ is attached to one end of the rock-shaft and connected with a link $F^3$, which is in turn connected with a bell-crank lever $F^2$, whose short arm is provided with a friction-roller $F^6$, which, when said lever is in position indicated in Fig. 2, is alongside of the pattern-chain E and within the range of a series of laterally-projecting extra links E'. As soon as by the movement of the pattern-chain the first of said links E' strikes beneath the roller $F^6$ it raises the short arm of the bell-crank $F^2$, throws the long arm outward, (or to the right in Fig. 2,) and rocks the shaft $F^7$ in a corresponding direction. This lifts the arm G, and through the train of links G' $G^3$ and lever $G^2$ throws down the shifter L, so as to bring its cam $l^2$ within the range of rotation of the stud $t$. Thereupon, in the manner set forth in my said patent, No. 385,322, the reversing mechanism operates and changes the continuous rotation of the cam-cylinder B into an oscillating movement of one hundred and eighty degrees. The lever $F^2$ is provided with a spring $F^8$, by means of which it is thrown back into the original position as soon as the travel of the pattern-chain carries the last extra link from beneath the roller $F^6$. This return of the lever $F^2$ lifts the shifter L out of engagement with the bolt-stud $t$, and the reversing mechanism thereupon ceases to act. The series of these links E', therefore, must correspond in length of travel with the period of oscillating movement of the cam-cylinder B.

The next group to be described is the aumatic mechanism for raising one-half of the needles collectively to the idle level, an operation which of course accompanies the change from rotary to oscillating movement. The cams which raise the needle thus are shown particularly in Figs. 18 to 24, inclusive. On the inside of the cylinder B are pivoted two wedge-shaped cam-pieces M M', connected together by means of a link $m'$, which is sunk within a vertical groove $m$ on the inside of the cylinder. One-half of the total series of needles $B^3$ are provided (see Figs. 32 and 33) with two lateral projections or hubs $b'b$. The former of these $b'$ is the ordinary hub which engages with the knitting-cams, the latter, however, $b$ is formed at the extreme lower end of the prolonged shank of the needle. By reason of this increased length of needles they are confined in the needle-cylinder by elastic bands $B^5$ $B^6$, arranged above and below the level of the driving-cams. The location of the cam-pieces M M' is such that when turned down into their lowest position the point of the cam M will engage beneath the lower hub $b$ and the point of the cam M' will engage beneath the upper hub $b'$. The contour of the cams is such that when in their lowest position they will raise a needle either of whose hubs is traveling along their upper surface to the idle level, and the range or movement of the cams M M' upon their pivots is such that when turned into their upper positions (indicated by the dotted lines in Figs. 21 and 24) they will engage above the hubs of the needles and force them down again into the active level. I use the second cam-piece M' partly as a safety device, in case any lower needle-hub should be broken or defective and escape the action of the cam M, (which is intended to be the efficient one under normal conditions,) to throw the series of needles collectively up or down at the proper instant with relation to the other movements of the machine. The further function of the cam M' is to engage with and lower the last needle of the individually raised series. I construct those needles which are to be individually raised and lowered (and of course those which remain permanently in an operative position) with but a single hub, and therefore use throughout the arc indicated by $A^x$, Fig. 32, the ordinary needle common to this class of machines; but for a reason which will be hereinafter explained it is desirable that the last needle of the individually raised series should be lowered as a part of the collectively raised group, and this lowering is effected by the upper cam-piece M'. As these operations attend the change from rotary to oscillating motion of the cam-cylinder, it is desirable to combine the actuating mechanism of said cams directly with the initial member of the group just previously described by which said change is effected, and I accomplish it in the following manner: The pivot or stem $M^3$ of the lower cam M extends out through the wall of the cylinder B, and carries at its outer end a cam-piece $M^2$, having the configuration shown clearly in Figs. 21 and 22. To turn this cam-piece $M^2$ in one direction or the other (and consequently raise or lower the interior cam M) I provide a pair of bolts F F', sliding in a direction radially to the cam-cylinder B, and at such a vertical distance apart as, when either is protruded, to engage with the upper or lower surface, as the case may be, of the exterior cam-piece $M^2$, so that as the cylinder B rotates past the end of the bolt said cam-piece $M^2$ must be turned by contact with the protruding bolt. Pins $m^3 m^4$ limit the movement of the cam $M^2$ in either direction. The bolts F F' are attached (see Figs. 18 to 22) to a rocking lever $f^2$, mounted upon the end of the rock-shaft $F^7$, above referred to as being the initial member of the reversing mechanism. When said rock-shaft is in the position corresponding with the continuous rotary movement of the cam-cylinder B, which may be termed "normal," the lower bolt F being withdrawn and the upper one F' protruding, the position of the cam-piece $M^2$ is such that it now clears the protruding bolt F', and both the interior cams M M' are in their raised positions, so as not to engage with the hubs of the needles. When, however, by the striking of the pattern-chain link E' against the lever $F^2$, said lever is thrown outward to produce the change of rotary into oscillating movement, the corresponding rocking of the shaft $F^7$ turns the rocking lever $f^2$ so as to protrude the lower bolt F and withdraw the upper one F'. During the single revolution that elapses before the reversing mechanism becomes actually operative the normal movement of the cam-cylinder B continues and carries the cam-piece $M^2$ into contact with the bolt F, in passing by which said cam-piece is turned and throws the interior cams M M' down into position to engage beneath the needle-hubs. This movement is indicated in Fig. 20. The motion of the cam-cylinder being then instantly reversed, the cam M' engages for a half-rotation beneath the lower hubs $b$ of the needles and throws half of them to the idle level, and so long as the oscillating movement of the cylinder continues the cam-piece $M^2$ remains in that position. Coincidently with the return to continuous rotary movement of the cam-cylinder B the lever $F^2$ drops off from the links E', and is thrown inward, or to the left, as shown in Fig. 21. This protrudes the bolt F', and as it is struck by the cam-piece $M^2$ it turns said cam-piece and throws up the interior cam-pieces M M', so as to engage above the needle-hubs and throw the needles down again into action.

It will be observed that these two groups of mechanism—to wit, the reversing and the cam-shifting—are essentially companions, and hence they can readily be derived from the same operative device upon the pattern-chain.

The next group of devices is that which effects the raising of individual needles from the active to the idle level. This action, as is well known, takes place at the end of each half-rotation, the end needles of the active series being raised. The raising is directly effected by means of a pair of pawls whose individual details are shown in Figs. 26 and 27, while their actuating mechanism and the relation of their parts are indicated in Figs. 14 to 17, both inclusive, and Figs. 23 and 24.

In my Letters Patent No. 388,721, dated August 28, 1888, I have described a pair of spring-actuated raising-pawls whose operation is, broadly speaking, similar to that of the pawls now about to be specified, there being, however, an important feature of improvement in the details of construction of the pawl itself, which I now desire to claim. As the pawl is obliged to oscillate in a vertical plane, and as it must in its movement hug closely the interior curved surface of the cam-cylinder, in order not to lose its hold upon the needle-hub, it has been difficult to give the pawl the proper dimensions for raising the needles fully to the idle level, because with any substantial increase of its length the difficulty of holding it near the surface of the cylinder increases enormously. To overcome this trouble and enable a pawl of the proper length to accommodate itself to the concave surface of the cylinder, I construct it in the manner shown in Figs. 26 and 27, where $p'$ represents one of the pawls. Throughout a portion of its periphery it is slightly curved in conformity with the concave surface of the cylinder, but the free end $r^3$ is hinged at $r^2$ to the main stem of the pawl, so as to turn slightly upon an axis at right angles to the axis of rotation of the pawl itself. Thus when the pawl is vertical, instead of the free end being at a distance from the internal surface of the cylinder, (as would be the case were the pawl straight,) it gives enough at the hinges to keep it in just the proper position beneath the needle-hubs. So, also, when the pawl is depressed within its cavity in the cam-ring of the needle-cylinder (as described in my said patent, No. 388,721) the hinge enables it to lie snugly in place.

It is not deemed necessary to describe the mode of operation of the pair of pawls $p\ p'$ in view of said patent, and I will therefore proceed immediately to describe the mode by which they are thrown into play. The pawls are normally held down by springs $u$ upon their shanks, and rest upon spring-fingers $p^2$ $p^3$, arranged within the cavities of the cam-ring. These spring-fingers are attached to stems $p^4\ p^5$, extending radially outward through the cylinder B, and by turning said stems in one direction or the other the pawls $p\ p'$ are raised into their active position or are permitted to be carried down by the pressure of their springs $u$. The mechanism for turning said stems is as follows: Upon the outside of the cam-cylinder is fitted a horizontal segment P, at the ends of which are freely hinged two lever-arms $P^3\ P^4$, rigidly attached to the stems $p^4\ p^5$. Said segment P is mounted upon a vertical standard $P^2$, at whose lower end is a horizontally-projecting cam-piece $P'$, whose cross-section is the sharp-pointed oval indicated in Fig. 30. This cam-piece $P'$ is intended to be acted upon and raised or lowered by the action of the bolts $w\ w'$ sliding horizontally in a direction radial to the cam-cylinder B. (See Figs. 14 to 17, inclusive.) According as the upper or lower of these bolts is protruded the cam-piece $P'$ will in rotating past them be depressed or raised. As the segment P is thus moved in the same direction, it turns the stems $p^4\ p^5$ by means of the lever-arms $P^3\ P^4$, with the consequent result, above referred to, upon the pawls $p\ p'$.

The mechanism for protruding said bolts at the proper interval consists of the following devices. Said bolts are attached at their outer ends to a cross-head K upon one end of a rock-shaft K', carrying at its other end an arm $K^3$, connected by a link $K^2$ with a bell-crank lever $K^4$, similar in construction to the bell-crank lever $F^2$, but facing it, as shown in Fig. 2, and adjacent to the other pattern-chain $e$. Said bell-crank $K^4$ has a friction-roller $K^5$, adapted to be acted upon by laterally-projecting links $e'$. When one of said links arrives beneath said roller, it throws the bell-crank $K^4$ to the left, as indicated in Fig. 17. This movement protrudes the upper bolt $w'$, so that it engages with the cam-piece $P'$, which is then in its normal raised position. Said cam-piece is depressed in passing by the bolt and carries down the segment P, thus bringing the pawls $p\ p'$ into operation, as above stated.

The converse movement of the segment to permit the descent of the pawls $p\ p'$ into their cavities is effected by the protrusion of the other bolt $w$, and this is accomplished by the shifting of the bell-crank $K^4$ in the other direction, as indicated in Fig. 16. It should be observed that the lateral projection of the cam-piece $P'$ is considerably greater than that of the cam-piece $M^2$, so that the two bolts $w\ w'$, which act upon the former, are clear of the latter.

The next group of devices is that which effects the lowering of individual needles at each half-rotation during the oscillating movement of the cylinder, the needles lowered being the end ones of the idle group. The device for directly effecting this is a depending pawl $d$, whose general operation in this particular is similar to that described in my Letters Patent No. 388,721, but containing improvements in detail, which I will now specify. Said pawl is mounted upon a vertical standard D, hinged at bottom to a stud $D^3$ on the cam-cylinder, so that said standard can swing radially outward. At the top of the standard is a socket $D^9$, in which is the horizontal pivot $d^8$ of the pawl $d$. Said pivot is somewhat longer than the depth of the socket and carries at its outer end a thumb-nut $d'$, between which and the proximate face of the socket $D^9$ is a spring tending to push the pivot $d^8$ outward. A portion of the upper periphery of the pivot $d^8$ is flattened on each side at an incline of, say, forty-five degrees (see Fig. 29) to the axis of the pawl itself, and a vertical plunger $d^4$, arranged in a cavity in the top of the standard, bears down upon the flattened part of the pivot $d^8$ under pressure of the spring $d^3$. The purpose of this device is to hold said pawl lightly, but with sufficient force to overcome gravity, in one or the other of its extreme positions, in order that it may, when in action, be ready to seize and act upon the needle-hubs, which it could not do if it hung down in a vertical line. On each side of the point of suspension of the pawl $d$ are mounted upon the socket $D^9$ two wedge-shaped cams $d^5$ $d^6$, shaped like half-crescents, with their ends converging immediately below the axis of the pivot $d^8$. As the pawl $d$ swings in accomplishing its work, it is compelled to ride upon the surface of one or the other of the cams $d^5$ $d^6$, this movement being permitted by the longitudinal movement of the pivot $d^8$. The purpose thereof is to permit the end of the pawl $d$ to hug very closely the concave surface of the cylinder B during the whole period of swinging movement, thus effectively controlling the needle-hub, with which it is engaged for the time being.

Since the lowering-pawl $d$ is only operative when the raising-pawls $p$ $p'$ are idle, and vice versa, it is thrown into and out of play by the same movement which actuates them conversely, and in the following manner: As above stated, the standard D of the lowering-pawl $d$ swings radially toward and from the cylinder. When in its inward position, said pawl is operative, but when outward it is clear of the needles. The two positions are indicated in Figs. 16 and 17. On the inside of the standard D, and opposite to the vertically-moving piece $P^2$, is an inclined notch $D'$, Fig. 28, against which a wedge $D^2$, attached to said piece $P^2$, bears. Some distance above this point the standard D is perforated to permit the passage of the stud $D^6$, around whose outer end is a spring $D^5$, bearing against the outer side of the standard and tending to throw it toward the cam-cylinder. Whenever the cam-piece $P'$ is depressed, in the manner above stated, to throw the raising-pawls into play, the wedge $D^2$ in descending forces the standard D outward, as shown in Fig. 17, and when said cam-piece $P'$ is elevated to throw the raising-pawls $p$ $p'$ out of play the return of the wedge $D^2$ into the notch $D'$ permits the spring $D^5$ to throw the standard inward, or toward the cylinder, as shown in Fig. 16. Thus the raising and lowering pawls, whose periods of activity are correlative, are dependent upon the same automatic actuating mechanism, controlled by a single pattern-chain $e$.

The next group of devices is the controlling mechanism for the extra thread, whose object is, at predetermined intervals, to break said thread without interfering with the knitting operations of the other thread or threads, and to hold it in position ready to resume its feed when automatically permitted to do so. At a suitable point on the base-plate of the machine is a vertical post C, upon which is an adjustable guide-piece $C^{15}$. At the top of the post C is secured a horizontal piece $C'$, at one end of which is a transverse piece $C^{12}$, carrying a series of eyes $C^{10}$ for the various threads, while at the other end is an outwardly-depending guide-tube $C^2$, longitudinally slotted, as indicated at $C^{16}$, to permit the ready insertion of a thread or threads. Said tube terminates a short distance above the usual thread-carrier $B'$, so as to conveniently deliver the thread thereto. On top of the piece $C'$, and adjacent to the point of attachment of the tube $C^2$, is a small housing-piece $C^9$, containing in suitable bearings a roller $C^8$, and also supporting a lever $C^5$, at whose forward end is a roller $C^7$, placed immediately above the roller $C^8$. Said lever is slotted, as shown at $C^6$, to permit the thread to pass through it and between the rollers $C^7$ $C^8$ on its way to the tube $C^2$. The outwardly-projecting end of the lever $C^5$ rests upon one arm $C^{14}$ of a bell crank pivoted at $C^{17}$ upon the piece $C'$, and having its other arm $C^{13}$ extending vertically downward to a point a short distance above the guide-piece $C^{15}$, above referred to. Said guide-piece receives the upper part of a vertical rod $C^{18}$, which terminates immediately beneath the arm $C^{13}$ of the bell-crank, the opposing faces of both being correspondingly beveled, as shown at $C^{179}$. The rod $C^{18}$ is free to slide vertically in the guide $C^{15}$, and its upper movement will bring it into contact with the lower end of the arm $C^{13}$, whereupon the inclination of the respective ends will throw the arm $C^{13}$ to the left, and thus raise the other arm $C^{14}$ of the bell-crank. This will in turn raise the rear end of the lever $C^5$ so as to bring the rollers $C^7$ $C^8$ together firmly. The extra thread, after passing through one of the eyes $C^{10}$ and between a pair of tension-disks $C^4$, is carried through a hook upon the end of a spring-arm $C^3$, which overhangs the lever $C^5$. This thread passes thence through a slot $C^6$ in the lever $C^5$, down between the rollers $C^7$ and $C^8$, and through the tube $C^2$ to the thread-carrier $B'$. The main thread passes directly from one of the eyes $C^{10}$ to the top of the tube $C^2$, and down through it, side by side with the extra thread. When, by the shifting of the bell-crank in the manner above described, the rollers $C^7$ and $C^8$ are pinched together upon the thread, they cause it to break at a point which I have found by experience is always within the tube $C^2$, and thus the thread when broken and held by said rollers does not fly out of contact with the main thread in said tube, but remains there, and the moment that the pressure from the rollers is released it will catch on and pass down with the other thread, so as to again become a knitting-thread. To effect the automatic control of this thread-controlling mechanism, it is only necessary to shift the rod $C^{18}$ in one direction or the other, and I accomplish this in the following manner: The lower end of said rod is connected freely (see Figs. 3 and 4) with one end of a horizontal lever $J'$, whose other end is pivoted to a second horizontal lever $J$. The lever $J$ carries at its outer end a friction-roller $j$, which rests upon the top of the pattern-chain $E$. At certain intervals in said pattern-chain a series of vertically-projecting links $E^2$ is arranged, and when the first of these arrives beneath the roller $j$ it raises the end of the lever $J$, and by means of the lever $J'$ raises the rod $C^{18}$ so as to thrust it against the bell-crank arm $C^{13}$, and in the manner above described break and hold the extra thread. So long as it is retained in a raised position by the series of links $E^2$ the broken thread is held; but when by the return of low links upon the chain $E$ the lever is again permitted to descend the rod $C^{18}$ drops and the bell-crank $C^{13}$ $C^{14}$ resumes its normal position, thus permitting the lever $C^5$ to rise and free the broken thread.

The next group of devices comprises the automatic stop-motion. At certain intervals in the knitting operations—as, for instance, when it is desired to change from high to low speed, and vice versa—it is desirable that the machine should automatically stop, both in order that the attention of the operative may be called thereto at the proper time, and because the necessary change can be better effected by bringing the mechanism to rest. This stop-motion I so arrange as that it can also be subject to the independent control of the attendant, and it consists of the following elements, (see Figs. 5, 6, 7, 8, and 9:) A belt-shifter $a$ slides horizontally in bearings $A^{15}$, and is suitably arranged to throw by such movement the belt $A^5$ from the fast pulley $A^{14}$ to the loose pulley $A^7$, and vice versa. The curved link $a'$ is attached to the belt-shifter $a$, and a spiral spring $a^2$ is applied thereto in such a manner as to normally tend to throw the belt-shifter in the direction of the loose pulley. Said link is attached at its curved end to an arm $a^4$, mounted upon a shaft or spindle $a^{18}$, whose other end has a hand-wheel $a^3$. This shaft or spindle is supported by and turns freely within a longitudinal sleeve $N$, which is of sufficient length to bring the hand-wheel $a^3$ into convenient position to be grasped by the operator. By turning said hand-wheel or shaft in one direction or the other the curved link $a'$ will be both shifted longitudinally and turn upon its pivoted connection with the belt-shifter $a$, and the character of its curve is such that when in its extreme raised position the end which is attached to the arm $a^4$ will be thrown past the center of the shaft $a^{18}$, so that the pressure of the spring $a^2$ will lock it. This position corresponds with the holding of the belt upon the fast pulley, and when it is desired to shift said pulley a very slight turning of the hand-wheel $a^3$ and shaft $a^{18}$ will throw the curved link $a'$ over the center of the shaft, and the tension of the spring $a^2$ will thereupon throw the belt-shifter and link so as to carry the belt to the loose pulley. In Fig. 5 the former position is indicated by the solid lines and the latter by the dotted lines.

In order to actuate the shaft $a^{18}$, and consequently to produce the same result automatically, I attach to the end of the arm $a^4$ a vertically-movable rod $a^5$, having near its upper end a notched shoulder $a^6$. A lever-arm $a^{12}$ bears at one end against this shoulder $a^6$, and is provided at the other end with a friction-roller $a^{17}$, which rests upon a pattern-chain $e$, and is adapted to be shifted vertically by raised links or projections $e^2$. When thus raised, the end of the lever $a^{12}$ bears upon the shoulder $a^6$, throws down the rod $a^5$, and by turning the lever-arm $a^4$ carries the link $a^8$ past the center of the shaft $a^{18}$ and permits the spring $a^2$ to actuate the belt-shifter $a$. As soon as the raised link $e^2$ passes by the roller $a^{17}$, the spring $a^{10}$ throws the lever $a^{12}$ back into its proper position, and thereupon the rod $a^5$ can be returned to the position ready for another tripping. Its return is effected by turning the hand-wheel $a^3$, and in the following manner: On the under side of the table or frame $Y$, through which said rod $a^5$ passes, is pivoted a dog $a^8$, having an inclined lateral projection $a^9$, adapted to engage with a pin $a^7$ upon the side of the rod $a^5$. A spring $a^{11}$ normally holds the said dog in such a position that its inclined projection $a^9$ intersects the line of vertical movement of the pin $a^7$ with the rod $a^5$. When said pin descends, the dog $a^8$, being free to move in the corresponding direction, turns enough to permit the passage of the pin $a^7$; but upon the ascent of the rod $a^5$ the pin $a^7$ strikes against the under side of the inclined projection $a^9$, and as the dog $a^8$ is not free to turn in the corresponding direction (being held by the under side of the table $Y$) it deflects the rod $a^5$ to one side, so that its upper end shall in rising clear the end of the lever $a^{12}$, which otherwise it would strike. A stud $a^{13}$, seated in a cavity in the side of the opening through which the rod $a^5$ passes, and provided with a spring $a^{14}$, bears against the back of the rod $a^5$, and as soon as the latter in rising has carried the stud $a^7$ past the end of the incline $a^9$ upon the dog $a^8$ said spring-actuated stud $a^{13}$ immediately throws the upper end of the rod $a^5$ over toward the lever $a^{12}$, and the end of the latter re-engages with the shoulder $a^6$.

The next group of devices is that which contains the mechanism for changing from high to low speed, and vice versa. These are shown in Figs. 10 to 13, both inclusive. The driving-shaft A of the mechanism carries two dish-shaped pulleys $A^3$ $A^4$, mounted upon sleeves $A^{19}$ $A^{20}$, respectively, which run loose upon said shaft. These pulleys face each other upon their open sides, as indicated in the sectional view of Fig. 13, and the inside of their rims is beveled or flaring, as there shown. Intermediate between said pulleys, and rigidly attached to the shaft A, is a coupling-pulley $N^{13}$, whose periphery is beveled in opposite directions in correspondence with the internal bevel of the pulleys $A^3$ $A^4$. The shaft A has a limited longitudinal play, and its movement in one direction or the other causes the coupling-pulley $N^{13}$ to jam itself within the rim of one or the other of the pulleys $A^3$ $A^4$ and for the time being to couple that one to the shaft A. The pulleys $A^3$ $A^4$ are driven at different rates of speed by means of independent belts $A'$ $A^2$, respectively connected with the large pulley Z and small pulley $Z'$, mounted upon a common driving-shaft $Z^2$, as shown in Fig. 11$^a$. The low-speed belt may conveniently be run at the rate of one hundred and fifty revolutions per minute and the high-speed belt at four hundred revolutions.

The longitudinal shifting of the shaft A, which couples one or the other of these pulleys to itself, is effected by devices which I find it convenient to mount in the following manner: Upon the sleeve N, (above referred to as affording a bearing for the stop-motion shaft $a^{18}$,) and which sleeve itself rotates freely in bearings Q Q, I attach a lever $N^2$, whose outer end is pivoted to a link $N^3$, connected with a rocking arm $N^4$, mounted upon one end of the rock-shaft $N^{12}$. Said rock-shaft is provided with an eccentric $N^6$, engaging with the bifurcated upper end of a lever $N^7$, pivoted at $N^8$, whose lower end $N^9$ is bifurcated at right angles to the upper, and embraces between suitable flanges $N^{10}$ the end of the driving-shaft A. A long lever $N'$ is mounted upon the outer end of the sleeve N, (being thus placed in convenient juxtaposition to the hand-wheel $a^3$ of the stop-motion,) and by throwing this long lever in one direction or the other the shaft A will be longitudinally shifted, so as to couple its pulley $N^{13}$ with either the high or low speed driving-pulley. The high speed I use while knitting the tubular portion of the stocking, and I change to the low speed when the reversing mechanism becomes operative.

In the foregoing description I have incidentally, while specifying the several groups of mechanism, set forth the mode of operation of the members of each. I will now describe their combined operation in forming a stocking which is to have, for instance, a white heel and toe, while the remainder thereof is of mixed or colored fabric, produced by twisting in with the white yarn one of another shade. The white main knitting-thread is brought down through the tubes $C^2$, and passes thence through the thread-guide $B'$ to the needles. The colored extra thread, after passing through the controlling devices and the tubes $C^2$, as above described, is caused to engage with the main thread. Assuming that the knitting is properly started, the cylinder rotates continuously, and in the usual manner forms the leg of the stocking. When the proper point is reached for commencing the formation of the heel, the pattern-chain E actuates both the reversing mechanism and the needle-raising cam M. Half the needles (viz., those included within the dotted bracket $B^\times$, Fig. 32) are thus raised to the idle level, and immediately the oscillating movement of the cam-cylinder begins. Simultaneously with this the same pattern-chain actuates the shifting-rod of the thread-controlling mechanism, whose rollers thereupon pinch the extra thread and cause it to break off within the tube $C^2$, where the end remains. The machine, therefore, now commences to knit the heel from the white thread only, and immediately after the first oscillation the other pattern-chain $e$ trips the actuating mechanism, whereby the pawls $p$ $p'$ for raising individual needles are thrown into play. Said pawls thereupon commence to raise the opposite end needles to the idle level, and thus the narrowing process necessary for the formation of the heel is effected. The individually raised needles are those included within the dotted brackets $C^\times$ (see Fig. 32) on each side, while the needles which are included within the dotted bracket $D^\times$ are those which remain permanently in position. After an interval the pattern-chain $e$ again trips the actuating mechanism of said pawls, so as to throw them out of play, and to simultaneously bring into play the lowering-pawl $d$. This lowers the opposite end needles at each oscillation to produce the widening, and its action continues until the last remaining needle of the individually raised series is reached. This needle is indicated in Fig. 32 by $B^7$, and is of course the one which has been the first to be individually raised. If it was depressed by the pawl and the rotary knitting were then recommenced, a dropped stitch or loop would be found at the point where the knitting produced by the oscillating movement merged into that produced by the renewed rotary movement. This fact is well known to knitters, and heretofore it has been customary, even when the machine was automatic, to stop it and bring down the said last needle $B^7$ by hand before resuming the knitting operation.

I avoid the dropping of a loop while still maintaining the automatic operation, and to this end I so construct the pattern-chain E that it shall before said depressing-pawl throws down said last needle B⁷ throw the internal lowering-cams M M' into play, and at the same time trip the shifting mechanism of the reverse motion, and thereby change the movement of the machine back to continuous rotary motion. Thus the needle B⁷ is brought down by the cam M', and descends as a part of the series which has been collectively raised. There is therefore no oscillation of the machine to correspond with the lowering of this last needle, and consequently I avoid the loss of a loop at that point and obtain a perfect fabric. Immediately before the resumption of continuous rotary motion the rod of the thread-controller is again shifted, so as to free the broken extra thread, which then immediately re-engages with the main thread and the foot of the stocking is knit in mixed colors. When the machine approaches the point where narrowing and widening for the toe is to take place, the same set of operations is repeated with a like result, and when the toe is finished the machine automatically stops. The change from high to low speed, and vice versa, may attend the two different movements of the cam-cylinder, as before stated, and obviously all of the above-described co-operative actions may be controlled in any desired manner by a predetermined grouping of the patterns upon the chains.

Having thus described my invention, I claim—

1. The combination of the bolt-shifter for the reverse motion, the pattern-chain, the lever actuated thereby, and mechanism, substantially as set forth, whereby the movement of said lever actuates the bolt-shifter, as and for the purposes set forth.

2. The combination, with the needle-cylinder, and the needle raising and lowering cam M, arranged therein, of the stem M³, the exterior cam-piece M², mounted thereon, the bolts F F', the pattern-chain, and mechanism, substantially as set forth, whereby said bolts are by the action of the pattern-chain alternately protruded into and withdrawn from the range of said cam-piece M² as the same moves with the cylinder.

3. The combination, with the double-heeled needles, of the raising and lowering cams M M', the link $m'$, connecting the same, and mechanism, substantially as set forth, whereby said cams are actuated at proper intervals with reference to the movements of the cam-cylinder.

4. The combination, with the spring-actuated lifting-pawls whose stems extend outwardly through the cam-cylinder, of a vertically-movable shifting device connected with the said stems, a cam-piece P', mounted on said shifting device, the bolts $w$ $w'$, the pattern-chain, and mechanism, substantially as set forth, whereby said bolts are by the action of said pattern-chain alternately protruded into and withdrawn from the range of rotation of said cam-piece, substantially as set forth.

5. The lifting-pawl constructed in two parts, hinged together upon an axis at right angles to the axis of oscillation of said pawl.

6. The combination of the lowering-pawl, the hinged spring-actuated standard carrying said pawl, the wedge bearing against said standard, the cam-piece P', connected with said wedge, the bolts $w$ $w'$, the pattern chain, and mechanism, substantially as set forth, whereby said bolts are by the action of the pattern-chain alternately protruded into and withdrawn from the range of rotation of said cam-piece.

7. The combination, with the needle-raising cams, and with the cam-shifter for the reverse motion, of a pattern-chain, a lever actuated thereby, a rock-shaft actuated by said lever, and mechanism, substantially as set forth, whereby the raising-cams and the cam-shifter of the reversing mechanism are coincidently actuated from the same movement of the lever, substantially as set forth.

8. The combination, with the vertically-movable piece P², of the segment P, the hinged arms P³ P⁴, and the lifting-pawls and their stems, the wedge D², the spring-actuated standard D, for the lowering-pawl, and mechanism, substantially as set forth, for shifting said piece P² vertically, whereby, when the lifting-pawls are thrown into play, the depressing-pawls are thrown out of play by the same movement, and vice versa.

9. The combination of the thread-breaking mechanism, substantially as set forth, the reversing mechanism, substantially as set forth, and the needle-elevating cams, substantially as set forth, with a single pattern-chain, whereby said several groups are simultaneously actuated, as and for the purposes specified.

10. The combination of the tripping-rod C¹⁸, the bell-crank actuated thereby, the lever C⁵, the rollers C⁷ C⁸, the former of which is mounted upon said lever C⁵, the tube C², and mechanism, substantially as set forth, whereby said tripping-rod is shifted at proper intervals with relation to the movements of the knitting mechanism.

11. The combination, with a thread-controlling device adapted to break the thread by nipping it, and with the rotating thread-eye, of a stationary tube interposed between said breaking mechanism and the thread-eye, whereby the broken end of the thread will be held in position for re-engagement at the proper time.

12. The combination of the spring-actuated belt-shifter, the curved link connected therewith, the shaft $a^3$ and lever-arm thereon connected with said link, the tripping-rod $a^5$, the lever $a^{12}$, and the pattern-chain provided with projections adapted to trip said lever, substantially as set forth.

13. The combination, with the belt-shifting mechanism, substantially as set forth, and with the pattern-chain and lever actuated thereby, of the notched tripping-rod adapted to engage with said lever, the spring bearing against one side thereof, the stud mounted on said lever, and the spring-actuated dog having an incline upon one side which engages with said stud, substantially as set forth.

HARRY C. RIGHTMIRE.

Witnesses:
JAMES H. BELL,
E. REESE.